US012638806B2

(12) United States Patent
Kyotani

(10) Patent No.: US 12,638,806 B2
(45) Date of Patent: May 26, 2026

(54) IMAGE FORMING APPARATUS AND INITIALIZATION METHOD OF INITIALIZING CONSUMABLE MEMORY INCLUDED IN CONSUMABLE ATTACHED TO MAIN CASING OF IMAGE FORMING APPARATUS

(71) Applicant: BROTHER KOGYO KABUSHIKI KAISHA, Nagoya (JP)

(72) Inventor: Tadao Kyotani, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/816,688

(22) Filed: Aug. 27, 2024

(65) Prior Publication Data

US 2024/0419114 A1 Dec. 19, 2024

Related U.S. Application Data

(63) Continuation of application No. PCT/JP2023/004922, filed on Feb. 14, 2023.

(30) Foreign Application Priority Data

Feb. 28, 2022 (JP) ................................ 2022-029621

(51) Int. Cl.
*G03G 21/00* (2006.01)
*G03G 15/08* (2006.01)
(Continued)

(52) U.S. Cl.
CPC ..... *G03G 21/1878* (2013.01); *G03G 15/0863* (2013.01); *G03G 21/1633* (2013.01);
(Continued)

(58) Field of Classification Search
CPC ............... G03G 15/553; G03G 15/556; G03G 15/0863; G03G 21/1875; G03G 21/1878;
(Continued)

(56) References Cited

U.S. PATENT DOCUMENTS 5,860,363 A 1/1999 Childers et al.
6,351,621 B1 * 2/2002 Richards ............. B41J 2/17503 399/25

(Continued)

FOREIGN PATENT DOCUMENTS

JP 4-95975 A 3/1992
JP 10-202900 A 8/1998

(Continued)

OTHER PUBLICATIONS

International Preliminary Report on Patentability issued in corresponding International Patent Application No. PCT/JP2023/004922 on Aug. 30, 2024.

(Continued)

*Primary Examiner* — Robert B Beatty
(74) *Attorney, Agent, or Firm* — Merchant & Gould P.C.

(57) ABSTRACT

In an image forming apparatus, a consumable includes a consumable memory. The consumable is attached to a main casing. The main casing has an opening through which the consumable is attachable. A cover is configured to open and close the opening. The controller is configured to perform: a reception process; a determination process; an initialization process; and a reading process. The reception process receives an instruction to initialize consumable memory information stored in the consumable memory. The determination process determines at least whether the cover is in an open state in accordance with the received instruction. When determining at least that the cover is in the open state, the controller performs the initialization process. The ini- (Continued)

tialization process initializes the consumable memory information. The reading process reads the consumable memory information from the consumable memory while the cover is in a closed state.

16 Claims, 8 Drawing Sheets

(51) Int. Cl.
*G03G 21/16* (2006.01)
*G03G 21/18* (2006.01)

(52) U.S. Cl.
CPC . *G03G 21/1889* (2013.01); *G03G 2215/0697* (2013.01); *G03G 2221/1823* (2013.01); *G03G 2221/1838* (2013.01)

(58) Field of Classification Search
CPC ....... G03G 21/1889; G03G 2215/0695; G03G 2215/0697; G03G 2221/1663; G03G 2221/1838; G03G 2221/1823; B41J 2/17506; B41J 2/17546; B41J 2/17566; G06F 3/1218; G06F 3/1219; G06F 3/1229; G06K 15/4075
USPC ............................................... 399/24, 25, 27
See application file for complete search history.

(56) References Cited

U.S. PATENT DOCUMENTS

| | | | | |
|---|---|---|---|---|
| 7,589,850 | B2 * | 9/2009 | Adkins | G06F 21/84 358/1.14 |
| 2006/0294415 | A1 * | 12/2006 | Kawai | G03G 15/556 714/6.1 |
| 2009/0324260 | A1 | 12/2009 | Andou | |
| 2021/0240103 | A1 * | 8/2021 | Kyotani | G03G 15/556 |
| 2021/0252869 | A1 | 8/2021 | Kishimoto | |
| 2022/0221816 | A1 | 7/2022 | Deura et al. | |
| 2024/0272577 | A1 * | 8/2024 | Suzuki | G03G 15/556 |
| 2025/0164907 | A1 * | 5/2025 | Kyotani | G06Q 10/20 |

FOREIGN PATENT DOCUMENTS

| | | | |
|---|---|---|---|
| JP | 2010-156737 | A | 7/2010 |
| JP | 2021-53967 | A | 4/2021 |
| JP | 2021-85888 | A | 6/2021 |
| JP | 2021-130229 | A | 9/2021 |

OTHER PUBLICATIONS

International Search issued in corresponding PCT/JP2023/004922, mailed Apr. 18, 2023.

* cited by examiner

IMAGE FORMING APPARATUS AND INITIALIZATION METHOD OF INITIALIZING CONSUMABLE MEMORY INCLUDED IN CONSUMABLE ATTACHED TO MAIN CASING OF IMAGE FORMING APPARATUS

REFERENCE TO RELATED APPLICATIONS

This is a by-pass continuation application of International Application No. PCT/JP2023/004922 filed on Feb. 14, 2023 claiming priority from Japanese Patent Application No. 2022-029621 filed on Feb. 28, 2022. The entire contents of the International Application and the priority application are incorporated herein by reference.

BACKGROUND ART

Consumables such as toner cartridges, drum cartridges, and ink cartridges, for example, are attached to image forming apparatuses. Each consumable includes a consumable memory. For example, Japanese Patent Application Publication No. H10-202900 discloses an ink cartridge in which a reset button for resetting contents of a memory mounted in the ink cartridge is provided. A user manually operates the reset button to reset the contents of the memory.

SUMMARY

Requiring the user to manually operate the reset button to reset the contents of the memory of the ink cartridge is one problem with the technology disclosed in the document described above, because the user cannot immediately begin to use the ink cartridge. It is an object of the present disclosure to enable the user to immediately begin to use a consumable after a controller initializes consumable memory information stored in a consumable memory of the consumable.

In order to attain the above and other objects, according to one aspect, the present disclosure provides an image forming apparatus including: a consumable; a main casing; a cover; and a controller. The consumable includes a consumable memory. The consumable is attached to the main casing. The main casing has an opening through which the consumable is attachable. The cover is configured to open and close the opening. The controller is configured to perform: a reception process; a determination process; an initialization process; and a reading process. The reception process receives an instruction to initialize consumable memory information stored in the consumable memory. The determination process determines at least whether the cover is in an open state in accordance with the received instruction. When determining at least that the cover is in the open state, the controller performs the initialization process. The initialization process initializes the consumable memory information. The reading process reads the consumable memory information from the consumable memory while the cover is in a closed state.

According to the image forming apparatus of the above aspect, the controller initializes the consumable memory information in a state where the cover is in an open state. Consequently, the cover is in the open state after the controller initializes the consumable memory information. Therefore, the controller can perform the reading process to read the consumable memory information from the consumable memory in a state where the cover is in a closed state. Hence, the user can begin to use the consumable immediately after the controller has initialized the consumable memory information.

According to another aspect, the present disclosure also provides an initialization method of initializing a consumable memory included in a consumable attached to a main casing of an image forming apparatus. The initialization method includes: a reception step; a determination step; an initialization step; and a reading step. In the reception step, the image forming apparatus receives an instruction to initialize consumable memory information stored in the consumable memory. In the determination step, the image forming apparatus determines at least whether a cover is in an open state in accordance with the received instruction. The main casing has an opening through which the consumable is attachable. The cover is configured to open and close the opening. When the image forming apparatus determines at least that the cover is in the open state, the initialization step is performed. In the initialization step, the image forming apparatus initializes the consumable memory information. In the reading step, the image forming apparatus reads the consumable memory information from the consumable memory while the cover is in a closed state.

The initialization method of the above aspect exhibits effects the same as the image forming apparatus described above.

DESCRIPTION

Hereinafter, an embodiment of the present disclosure will be described while referring to the accompanying drawings. The present embodiment will describe a case in which the image forming apparatus is a laser printer and the image formation is printing, as one example. However, the image forming apparatus may be a printer other than a laser printer. For example, the image forming apparatus 1 may be an inkjet printer.

<Overview of Structure of Image Forming Apparatus 1>

Figure 1:
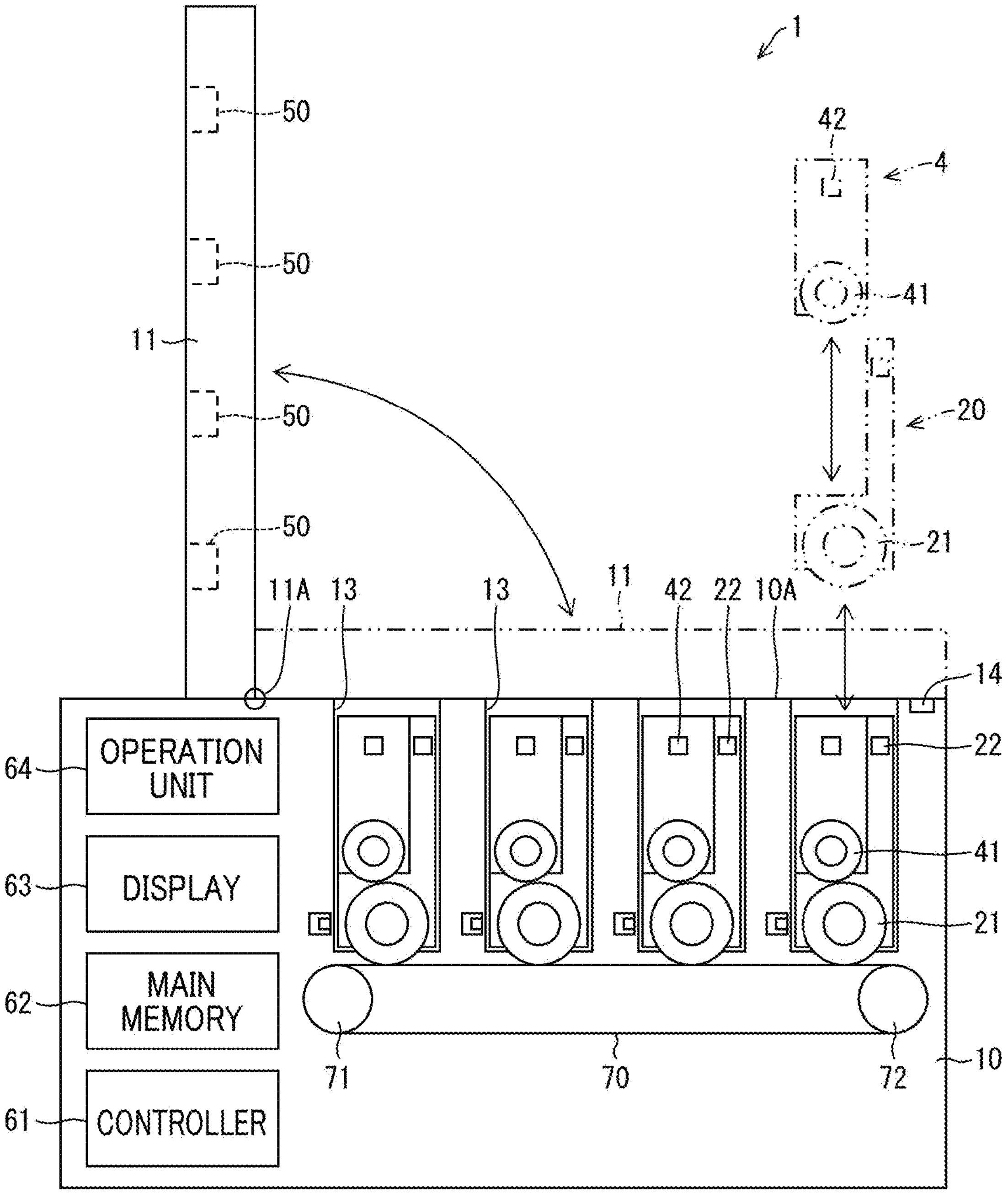
FIG. 1 is a schematic diagram of an image forming apparatus according to an embodiment of the present disclosure.
Figure 2:
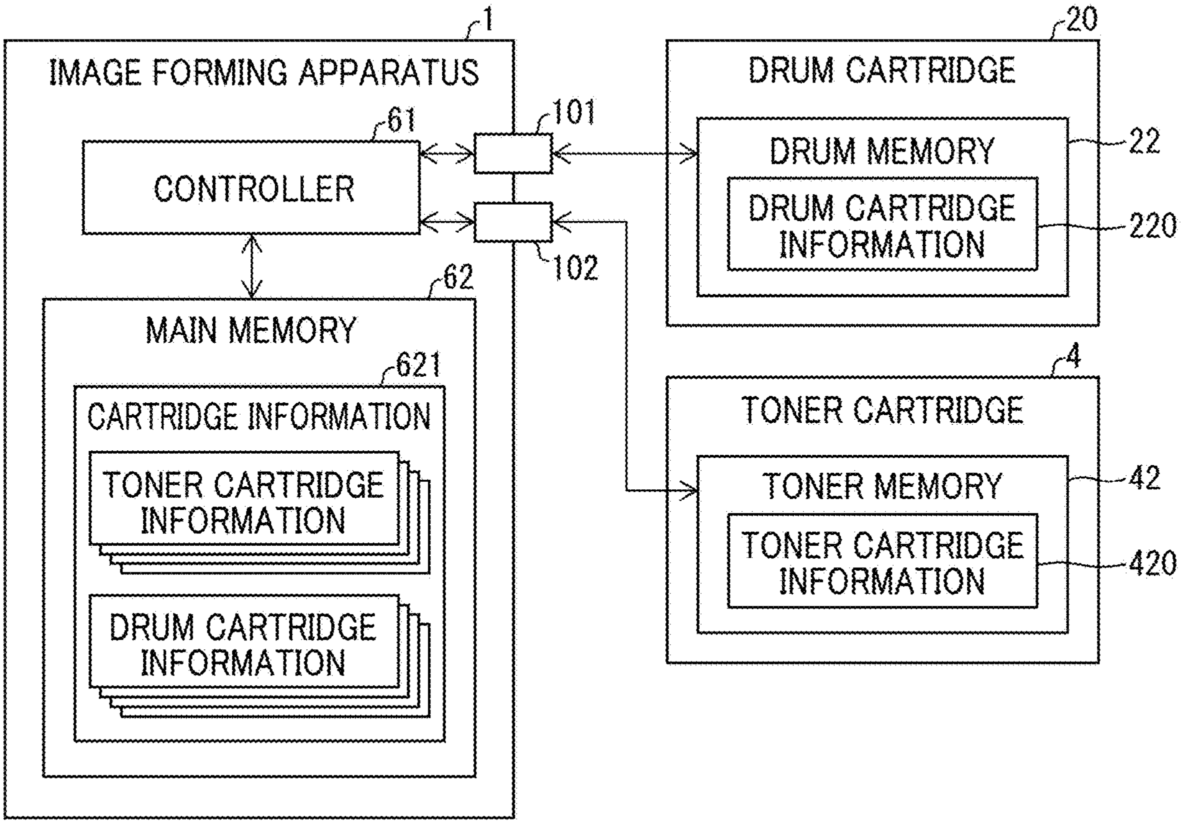
FIG. 2 is a diagram illustrating the internal structures of the image forming apparatus, including drum cartridges and toner cartridges.

FIG. 1 is a schematic diagram of an image forming apparatus 1. FIG. 2 is a diagram illustrating the internal structures of the image forming apparatus 1, including drum cartridges 20 and toner cartridges 4. As illustrated in FIG. 1, the image forming apparatus 1 includes a main casing 10, a cover 11, a cover sensor 14, drum cartridges 20, and toner cartridges 4. The image forming apparatus 1 also includes a controller 61, a main memory 62, a display 63, an operation unit 64, and a transfer belt 70.

The image forming apparatus 1 may include a display unit, such as a liquid crystal display or lamps, and an input unit, such as buttons. The liquid crystal display may also be integrally configured with a touchscreen to function as an input unit.

(Main Casing 10)

The toner cartridges 4 are attached to the main casing 10. As will be described later in detail, each toner cartridge 4 becomes integrated with a drum cartridge 20 by being attached to the drum cartridge 20. In other words, while attached to the drum cartridge 20, the toner cartridge 4 is attached together with the drum cartridge 20 to the main casing 10, thereby achieving an image forming apparatus 1 that includes the drum cartridges 20 and the toner cartridges 4.

Note that, in the image forming apparatus 1 according to the present embodiment, four toner cartridges 4 need to be attached in order to perform printing. In other words, the image forming apparatus 1 according to the present embodiment is configured to allow four drum cartridges 20 and four toner cartridges 4 to be attached thereto. However, the numbers of drum cartridges 20 and toner cartridges 4 attached to the image forming apparatus 1 are not limited to the example of FIG. 1. For example, the image forming apparatus 1 may be a monochrome printer that allows the attachment of a single drum cartridge 20 and a single toner cartridge 4.

Each toner cartridge 4 includes toner that is consumed when the image forming apparatus 1 performs printing. That is, the toner cartridge 4 is an example of a consumable for the image forming apparatus 1. Further, each drum cartridge 20 includes a photosensitive drum 21 that is used when the image forming apparatus 1 performs printing. The drum cartridge 20 is also an example of the consumable for the image forming apparatus 1.

The main casing 10 has an opening 10A through which the toner cartridges 4 and drum cartridges 20 are attachable. The main casing 10 has a rectangular box shape, for example. The main casing 10 accommodates therein the four drum cartridges 20, the four toner cartridges 4, the controller 61, the main memory 62, the display 63, the operation unit 64, and the transfer belt 70.

Note that the display surface of the display 65 may also be provided at the outer surface of the main casing 10 so that the user can visually recognize displayed information. Furthermore, in a case where the operation unit 64 comprises hardware buttons, the pressing surfaces of the operation unit 64 may also be provided at the outer surface of the main casing 10 so as to be operable by the user.

The main casing 10 has four cartridge holding units 13. Each cartridge holding units 13 is formed as a recess and has an opening. The drum cartridges 20 and the toner cartridges 4 are attached to the main casing 10 by being held in corresponding cartridge holding units 13.

(Cover 11)

A light source unit 50 is provided corresponding to each drum cartridge 20 at the cover 11. The cover 11 is pivotally movable about a pivot shaft 11A extending in a first direction between an open position depicted with solid lines in FIG. 1 in which the cover 11 opens the opening 10A and a closed position depicted with two-dot chain lines in FIG. 1 in which the cover 11 closes the opening 10A. The opening 10A provided at an upper end of the main casing 10 is opened and closed in accordance with pivotal movement of the cover 11. By rotating, the cover 11 can open and close the opening 10A formed in the top end of the main casing 10.

Note that the "first direction" denotes a direction in which the rotation center axis of a developing roller 41 in a toner cartridge 4 extends. The openings of the cartridge holding units 13 are exposed when the cover 11 is positioned at the open position and are covered by the cover 11 when the cover 11 is positioned at the closed position.

The cover sensor 14 that detects opening and closing of the cover 11 is provided at the opening 10A of the main casing 10. The cover sensor 14 is a contact-type sensor or an optical-type sensor, for example. The cover sensor 14 outputs a sensor signal to the controller 61 when the cover 11 is in the closed state. Note that the cover sensor 14 may instead output a sensor signal to the controller 61 when the cover 11 is in the open state.

(Toner Cartridges 4)

Each toner cartridge 4 includes a developing roller 41, and a cartridge casing that can accommodate therein developer as an example of the printing material. The cartridge casing is attachable to the main casing 10. The four toner cartridges 4 accommodate therein developer of colors different from one another (for example, colors of cyan (C), magenta (M), yellow (Y), and black (BK)) as the material used for performing image formation.

The developer is a material that is consumed during use. The developing roller 41 is a hollow cylindrical member that extends in the first direction and is rotatable about its developing axis extending in the first direction. When the toner cartridge 4 is attached to the drum cartridge 20, the outer circumferential surface of the photosensitive drum 21 contacts the outer circumferential surface of the developing roller 41.

Each toner cartridge 4 also includes a toner memory 42 as an example of the consumable memory. The toner memory 42 is positioned at the outer surface of the toner cartridge 4 on one side of the toner cartridge 4 in the first direction. The toner memory 42 is a memory from which information is readable and to which information is writable. For example, the toner memory 42 is a flash read-only memory (flash ROM) or an electrically erasable programmable read-only memory (EEPROM; registered trademark). "EEPROM" is a Japanese registered trademark of Renesas Electronics Corporation.

As illustrated in FIG. 2, the toner memory 42 stores therein toner cartridge information 420, which is information related to the toner cartridge 4. The toner cartridge information 420 is an example of the consumable memory information. The data structure of the toner cartridge information 420 will be described later with reference to FIG. 3.

(Drum Cartridges 20)

Each drum cartridge 20 includes a cartridge casing that is attachable to the main casing 10. The cartridge casing includes a photosensitive drum 21 as a component that is used for performing image formation. The photosensitive drum 21 is a replacement component that needs to be replaced since deterioration such as wear of the surface occurs during use. The photosensitive drum 21 is a hollow cylindrical photosensitive member extending in the first direction. The photosensitive drum 21 is rotatable about its drum axis extending in the first direction. The outer circumferential surface of the photosensitive drum 21 is coated with a photosensitive material.

Each drum cartridge 20 also includes a drum memory 22, which is an example of the consumable memory. The drum memory 22 is a memory from which information is readable and to which information is writable. For example, the drum memory 22 is a flash ROM or an EEPROM (registered trademark). The drum memory 22 stores therein drum cartridge information 220, which is information related to the drum cartridge 20. The drum cartridge information 220 is an example of the consumable memory information. The data structure of the drum cartridge information 220 will be described later with reference to FIG. 4.

<Cartridge Attachment and Printing Mechanism>

As illustrated in FIG. 1, the drum cartridges 20 and the toner cartridges 4 are attached to the main casing 10 in a state where the cover 11 is positioned at the open position. In a state where the cover 11 is positioned at the open position, the drum cartridges 20 and the toner cartridges 4 are inserted through the opening 10A into the corresponding cartridge holding units 13.

The four light source units 50 are mounted on the inner surface of the cover 11. Each light source unit 50 is arranged so as to face the surface of the corresponding photosensitive drum 21 in a state where the drum cartridge 20 is attached to the main casing 10 and the cover 11 is at the closed position. Each light source unit 50 has a plurality of light sources arranged in the first direction. Each light source can emit light to the outer circumferential surface of the photosensitive drum 21. Each light source is a light-emitting diode (LED), for example.

Each light source unit 50 is electrically connected to the controller 61. The controller 61 controls the light sources of each light source unit 50 to emit light in accordance with inputted image data. Each light source emits light toward the outer circumferential surfaces of the corresponding photosensitive drum 21. As a result, the photosensitive material on the outer circumferential surface of the photosensitive drum 21 is exposed by the light source unit 50 in accordance with the image data.

The transfer belt 70 is a component that transfers developer carried on the surface of each photosensitive drum onto printing paper. The transfer belt 70 is a replacement component that needs to be replaced since deterioration such as wear of the surface occurs during use. The transfer belt 70 is a belt having an annular shape that can contact each photosensitive drum 21. The outer circumferential surface of each photosensitive drum 21 can contact the outer peripheral surface of the transfer belt 70. During a printing process, the image forming apparatus 1 conveys printing paper between the transfer belt 70 and each photosensitive drum 21.

The transfer belt 70 is stretched around a drive roller 71 and a follow roller 72. The drive roller 71 drives the transfer belt 70. The controller 61 causes the drive roller 71 to rotate. The follow roller 72 rotates following movement of the transfer belt 70 in accordance with drive of the drive roller 71.

<Internal Structure of Main Casing>

The controller 61 includes an application-specific integrated circuit (ASIC), for example. The controller 61 is electrically connected to the main memory 62, the display 63, and the operation unit 64 provided in the main casing 10. The controller 61 executes various operations to cause the image forming apparatus 1 to perform various processes related to printing.

The controller 61 may include a processor, such as a central processing unit (CPU). When the controller 61 includes a processor, the main memory 62 stores therein a control program for implementing a method of controlling the image forming apparatus 1. With the processor performing operations according to the control program, the controller 61 may cause the image forming apparatus 1 to perform various processes.

The controller 61 may also include a computer-readable storage medium, such as the main memory 62, that stores therein the control program. The controller 61 can use any "non-transitory tangible medium" as the storage medium such as a ROM, as well as a tape, a disc, a card, a semiconductor memory, or a programmable logic circuit. The controller 61 may also use a random-access memory (RAM) or the like as a storage medium for developing the control program.

The control program may also be supplied to a computer via any transmission medium capable of transmitting the control program, such as a communication network, broadcast waves, and the like. Note that, according to one aspect of the present disclosure, the control program can be implemented in the form of data signals embedded in a carrier wave embodied in electronic transmission.

As illustrated in FIG. 2, the image forming apparatus 1 includes connectors 101 and connectors 102. In a state where a drum cartridge 20 is inserted into a corresponding cartridge holding unit 13 illustrated in FIG. 1, the corresponding connector 101 is electrically connected to the drum memory 22 of the drum cartridge 20, enabling the controller 61 to communicate with the drum memory 22. In other words, the controller 61 can execute a reading process to read information from the drum memory 22, and a writing process to write information to the drum memory 22.

In a state where a toner cartridge 4 is attached to the main casing 10, the corresponding connector 102 is electrically connected to the toner memory 42 of the toner cartridge 4, enabling the controller 61 to communicate with the toner memory 42. In other words, the controller 61 can execute a reading process to read information from the toner memory 42, and a writing process to write information to the toner memory 42.

The main memory 62 is a memory from which information is readable and to which information is writable. For example, the main memory 62 is a flash ROM or an EEPROM (registered trademark). The main memory 62 has one or more storage areas. In one example, each of the storage areas stores therein cartridge information 621.

The cartridge information 621 is information related to the cartridges attached to the image forming apparatus 1. Specifically, the cartridge information 621 includes the toner cartridge information 420 read from the toner memories 42 of the toner cartridges 4 of respective colors in such a manner that the toner cartridge information 420 can be identified for each toner cartridge 4.

The cartridge information 621 also includes the drum cartridge information 220 read from the drum memories 22 of the drum cartridges 20 in such a manner that the drum cartridge information 220 can be identified for each drum cartridge 20. The data structures of the toner cartridge information 420 and the drum cartridge information 220 stored in the main memory 62 as the cartridge information 621 will be described later in greater detail with reference to FIGS. 3 and 4.

In the following description, "recycling a cartridge" indicates that the cartridge is restored to a state suitable for use in printing by replacing or replenishing only those components of the cartridge that need to be replaced among the constituent elements of the cartridge. In other words, recycling a cartridge includes not only replenishing a consumed material, but also replacing a deteriorated component with a new one. Hereinafter, cartridges that have been recycled by replenishing materials or replacing components will be referred to as recycled cartridges.

<Data Structures of Cartridge Information>

(Toner Cartridge Information)

Figure 3:
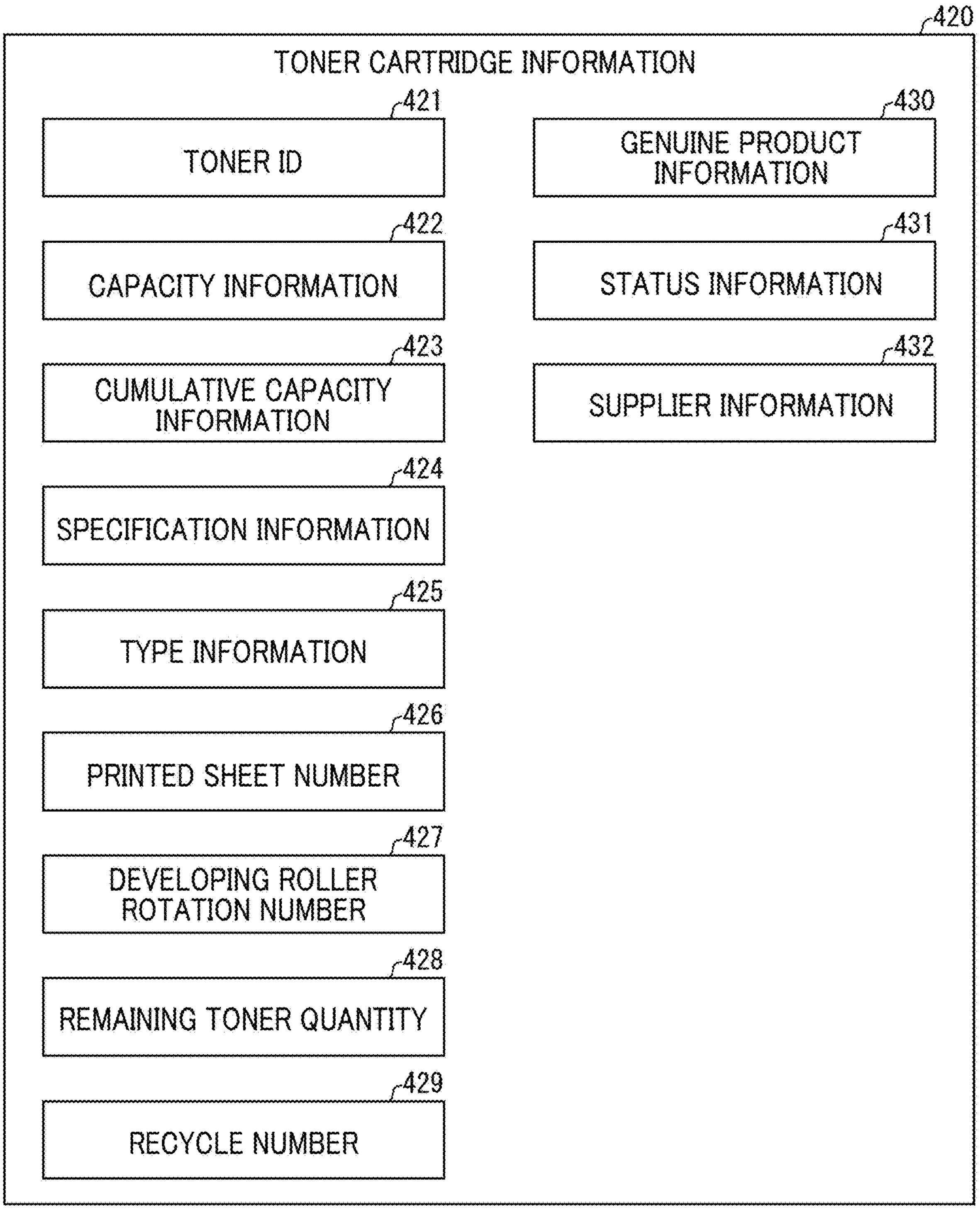
FIG. 3 is a diagram illustrating one example of a data structure of toner cartridge information stored in a toner memory.

FIG. 3 is a diagram illustrating one example of the data structure of the toner cartridge information 420 stored in the toner memory 42. As one example, the toner cartridge information 420 includes a toner ID 421, capacity information 422, cumulative capacity information 423, specification information 424, type information 425, and a printed sheet number 426. As one example, the toner cartridge information 420 also includes a developing roller rotation number 427, a remaining toner quantity 428, a recycle number 429, genuine product information 430, status information 431, and supplier information 432.

The toner ID 421 is identification information for uniquely identifying the toner cartridge 4. As one example, the toner ID 421 is a serial number unique to the toner cartridge 4. The capacity information 422 is information indicating the quantity of the printing material that the toner cartridge 4 can accommodate therein. As one example, four levels of capacity are set for toner cartridges 4 in the present embodiment. More specifically, the four levels of capacity that can be set for the toner cartridge 4 are, in order from lowest to highest, small capacity, standard capacity, large capacity, and extra-large capacity. The capacity information 422 indicates one of the four levels from among small capacity, standard capacity, large capacity, and extra-large capacity.

The cumulative capacity information 423 is information indicating a cumulative value of capacities indicated by capacity information 422 previously stored in the toner memory 42. The specification information 424 is information indicating a specification for the toner cartridge 4. There are three specifications for the toner cartridge 4: for “EU” (Europe); for “US” (United States); and for “JP” (Japan). The specification information 424 indicates one of these three specifications for EU, for US, and for JP.

The type information 425 is information indicating the type of the toner cartridge 4. At least two types are set for the toner cartridges 4 in the present embodiment: “subscription consumable”; and “commercial consumable”. The type information 425 indicates one type from among at least these two types, “subscription consumable” and “commercial consumable”.

The toner memory 42 of a subscription cartridge stores therein type information 425 that indicates the type “subscription consumable.” The image forming apparatus 1 can perform subscription printing while a subscription cartridge(s) is attached to the image forming apparatus 1. For example, a service provider supplies subscription cartridges to users who have concluded an agreement for the image forming apparatus 1. The toner memory 42 of a commercial toner cartridge 4, which can be purchased from an electronics retail store, an online shopping site, or the like, stores type information 425 indicating the type “commercial consumable.” In other words, “subscription consumable” represents a subscription cartridge that can be used in an image forming apparatus 1 for which an agreement has been concluded, while “commercial consumable” represents a commercial cartridge that can be purchased from an electronics retail store, an online shopping site, or the like.

The printed sheet number 426 is information indicating the number of sheets of paper that the image forming apparatus 1 has printed since the attachment of the toner cartridge 4 to the image forming apparatus 1. The developing roller rotation number 427 is information indicating the number of times that the developing roller 41 in the toner cartridge 4 has rotated in association with execution of printing since the attachment of the toner cartridge 4 to the image forming apparatus 1.

The remaining toner quantity 428 is information indicating the remaining quantity of toner in the toner cartridge 4. As one example, the remaining toner quantity 428 may be configured of a value corresponding to one of a plurality of levels from full to empty. The remaining toner quantity 428 may be configured of a character string such as “FULL” to “EMPTY”, a numerical value such as “100%” to “0%”, or information combining a character string and a numerical value, for example.

The initial value of the remaining toner quantity 428 is equivalent to the quantity required to fill a capacity corresponding to the capacity information 422. As toner is consumed through use, a sensor (not illustrated) may optically measure the toner cartridge 4, for example. The controller 61 may write the remaining quantity of toner acquired through measurements with this sensor (not illustrated) to the toner memory 42 as the remaining toner quantity 428.

As another example, the controller 61 may monitor the quantity of toner discharged from the toner cartridge 4 and consumed and may calculate the remaining quantity of toner based on the capacity information 422 stored in the toner memory 42 and the monitored consumption quantity of toner. The controller 61 may then write the calculated remaining quantity of toner to the toner memory 42 as the remaining toner quantity 428.

The recycle number 429 is information indicating the number of times that at least a part of the information stored in the toner memory 42 has been initialized in accordance with user instructions. In the present embodiment, the controller 61 performs the initialization of information in the toner memory 42 based on a user instruction once for each recycle.

Therefore, the “number of times that the initialization has been performed” in the toner memory 42 denotes the number of times that the toner cartridge 4 has been recycled. When the recycle number 429 denotes a value less than one, the recycle number 429 indicates that the toner cartridge 4 has never been recycled. When the recycle number 429 denotes a value greater than or equal to one, the recycle number 429 indicates that the toner cartridge 4 is a recycled cartridge.

The genuine product information 430 is information indicating whether the toner cartridge 4 is a genuine product or a non-genuine product. As one example, each toner cartridge 4 is classified as either a genuine product or a non-genuine product. The supplier information 432 is information indicating the manufacturer of the image forming apparatus 1 or a third party that has supplied the toner cartridge 4 to the user.

The status information 431 is information indicating whether the toner cartridge 4 is a new product or a non-new product. The term “new product” refers only to unused genuine products manufactured by the manufacturer of the image forming apparatus 1 and does not refer to third party products or remanufactured products. A third party product is a product manufactured by a third party other than the manufacturer of the image forming apparatus 1. A remanufactured product is a product manufactured by the manufacturer of the image forming apparatus 1 for which a third party has rewritten information in the consumable memory. The term “non-new product” refers to third party products, remanufactured products, and used genuine products.

(Drum Cartridge Information)

Figure 4:
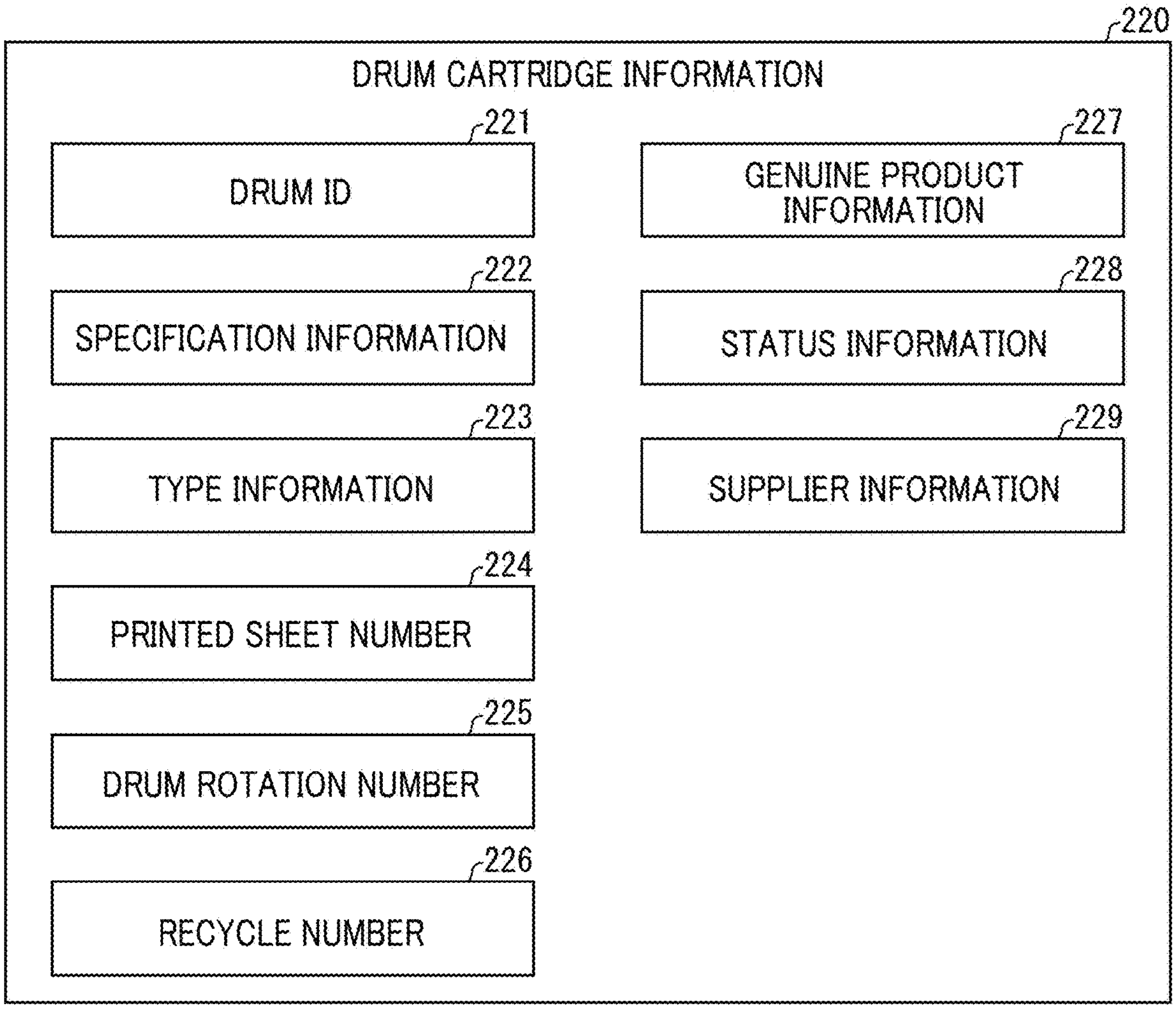
FIG. 4 is a diagram illustrating one example of a data structure of drum cartridge information stored in a drum memory.

FIG. 4 is a diagram illustrating one example of the data structure of the drum cartridge information 220 stored in the drum memory 22. As one example, the drum cartridge information 220 includes a drum ID 221, specification information 222, type information 223, a printed sheet number 224, and a drum rotation number 225. As one example, the drum cartridge information 220 also includes a recycle number 226, genuine product information 227, status information 228, and supplier information 229.

The drum ID 221 is identification information for uniquely identifying the drum cartridge 20. As one example, the drum ID 221 is a serial number unique to the drum cartridge 20. The specification information 222 is information indicating a specification of the drum cartridge 20. Similar to the toner cartridge 4, the drum cartridge 20 has three specifications: for EU; for US; and for JP. The specification information 222 indicates one of the three specifications for EU, for US, and for JP.

The type information 223 is information indicating the type of the drum cartridge 20. Similar to the toner cartridge 4, at least two types are set for the drum cartridge 20: “subscription consumable”; and “commercial consumable”. The type information 223 indicates one type from among at least these two types, “subscription consumable” and “commercial consumable”.

The printed sheet number 224 is information indicating the number of sheets of paper that the image forming apparatus 1 has printed since the attachment of the drum cartridge 20 to the image forming apparatus 1. The drum rotation number 225 is information indicating the number of times that the photosensitive drum 21 in the drum cartridge 20 has rotated in association with execution of printing since the attachment of the drum cartridge 20 to the image forming apparatus 1.

The recycle number 226 is information indicating the number of times that at least a part of the information stored in the drum memory 22 has been initialized in accordance with user instructions. In the present embodiment, the controller 61 performs the initialization of information in the drum memory 22 based on a user instruction once for each recycle.

Therefore, the “number of times that the initialization has been performed” in the drum memory 22 denotes the number of times that the drum cartridge 20 has been recycled. When the recycle number 226 denotes a value less than one, the recycle number 226 indicates that the drum cartridge 20 has never been recycled. When the recycle number 226 denotes a value greater than or equal to one, the recycle number 226 indicates that the drum cartridge 20 is a recycled cartridge.

The genuine product information 227 is information indicating whether the drum cartridge 20 is a genuine product or a non-genuine product. As one example, each drum cartridge 20 is classified as either a genuine product or a non-genuine product. The status information 228 is information indicating whether the drum cartridge 20 is a new product or a non-new product. The supplier information 229 is information indicating the manufacturer of the image forming apparatus 1 or a third party that has supplied the drum cartridge 20 to the user.

Hereinafter, the flow of steps in processes executed by the controller 61 will be described with reference to flowcharts. The processes executed by the controller 61 can be broadly classified into a recycling preparation phase and a recycled product usage phase. In the recycling preparation phase, the controller 61 executes various processes necessary for initializing cartridge information stored in the consumable memory. In the recycled product usage phase, the controller 61 executes various processes necessary for using a recycled cartridge when the recycled cartridge is attached to the image forming apparatus 1.

<Process Flow in Recycling Preparation Phase>

Figure 5:
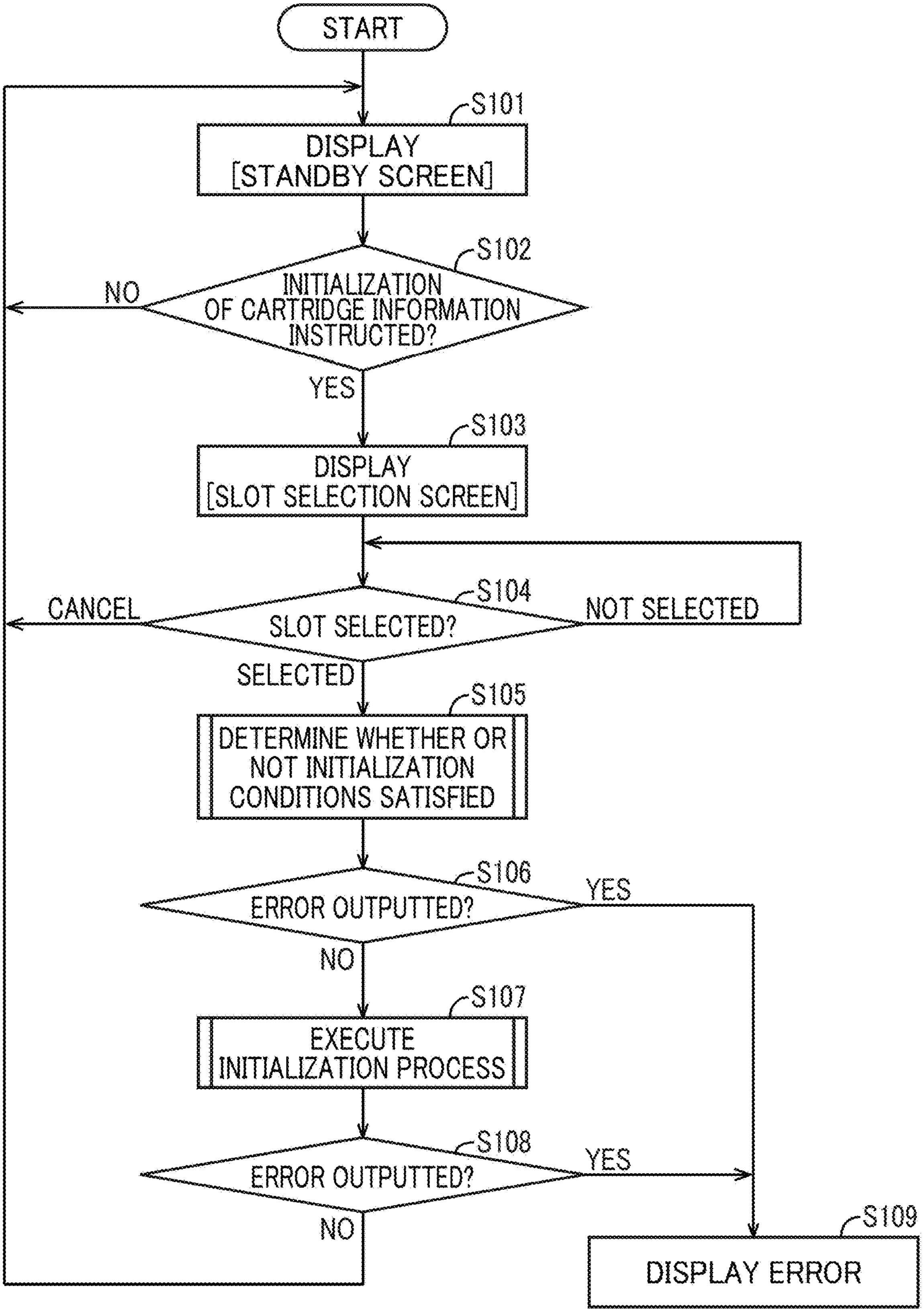
FIG. 5 is a flowchart illustrating the flow of steps in a process executed by the image forming apparatus in a recycling preparation phase.

FIG. 5 is a flowchart illustrating the flow of steps in a process executed by the image forming apparatus 1 in the recycling preparation phase. The recycling preparation phase includes a process to initialize cartridge information stored in a consumable memory in accordance with user instructions. The series of steps illustrated in FIG. 5 is the process executed by the controller 61.

The following describes the case of recycling a toner cartridge 4 in the recycling preparation phase as one example. Hence, initializing the toner memory 42 in the initializing process is merely one example. The controller 61 can also perform a process to initialize the drum memory 22 in accordance with user instructions.

When the controller 61 initializes a drum memory 22, the specification information 424, the type information 425, and the printed sheet number 426 in the following description will be replaced with the specification information 222, the type information 223, and printed sheet number 224, respectively. Additionally, the developing roller rotation number 427, the recycle number 429, the genuine product information 430, the status information 431, and the supplier information 432 will be replaced with the drum rotation number 225, the recycle number 226, the genuine product information 227, the status information 228, and the supplier information 229, respectively.

In step S101 the controller 61 causes the display 63 to display thereon a standby screen. The standby screen is a screen displayed while the image forming apparatus 1 is in a printing standby state, for example. The controller 61 causes the display 63 to display thereon the standby screen when the power to the image forming apparatus 1 is turned on, when the image forming apparatus 1 is restored from a sleep state, or the like. The standby screen includes user interface components for causing the image forming apparatus 1 to execute various operations. Hereinafter, the user interface components will be referred to as UI components.

The UI components may be configured of software buttons that the user can select by operating the operation unit 64, for example. The standby screen in the present embodiment includes a first UI component for instructing the image forming apparatus 1 to initialize the toner cartridge information 420 stored in the toner memory 42, as one example.

In step S102 the controller 61 detects that the initialization of the toner cartridge information 420 is instructed by the user. For example, the controller 61 may detect that the operation unit 64, which is a hardware button signifying “ACCEPT”, is pressed in a state where the first UI component in the standby screen is selected. Alternatively, the controller 61 may detect that a touch operation is performed on the first UI component through the operation unit 64 integrally configured with the display 63 as a touchscreen.

Thus, the controller 61 executes a reception process in S102 to receive an instruction for initializing the toner cartridge information 420. When detecting that the initialization is instructed by the user, the controller 61 proceeds along the YES branch of S102 to the process of S103.

When the controller 61 does not detect that the initialization of the toner cartridge information 420 has been instructed by the user, the controller 61 reaches a NO determination in S102 and returns to S101 to cause the display 63 to display thereon the standby screen. When another UI component that instructs another operation is selected in the standby screen, the controller 61 proceeds along the NO branch of S102 to a step for executing the operation in accordance with the instruction.

In step S103 the controller 61 causes the display 63 to display thereon a slot selection screen. The slot selection screen includes a second UI component that allows the user to select one of four slots provided in a drawer unit (not illustrated). The drawer unit is a frame capable of holding four toner cartridges 4. A toner cartridge 4 can be attached to each of the four slots.

As one example, the second UI component is configured of four buttons for respectively selecting one of the four slots, and a CANCEL button. The second UI component is configured so that the user can select one button from among the four buttons and the CANCEL button. The selection operation by the user may be performed through either hardware buttons or software buttons.

In step S104 the controller 61 determines which of the four buttons and the CANCEL button in the second UI component has been selected. When the controller 61 determines that one of the four buttons has been selected in the second UI component, the controller 61 advances from S104 to S105.

The controller 61 continues to perform the process in S104 while the user has not selected any button from among the four buttons and the CANCEL button in the second UI component. When the controller 61 determines that the CANCEL button has been selected, the controller 61 returns from S104 to S101 and causes the display 63 to display thereon the standby screen.

In step S105 the controller 61 executes a determination process to determine whether or not initialization conditions for the toner cartridge information 420 are satisfied in accordance with the instruction received in S102.

Specifically, the controller 61 communicates with the toner cartridge 4 to read the latest toner cartridge information 420 at this point and determines whether or not the toner cartridge 4 satisfies requirements for recycling. When the toner cartridge 4 satisfies the requirements for recycling, the controller 61 permits the initialization of the toner cartridge information 420. A detailed process flow for S105 will be described later with reference to FIG. 6.

In step S106 the controller 61 confirms whether or not an error has been outputted during the determination process in S105. When the controller 61 has not outputted an error, the controller 61 determines that the toner cartridge information 420 can be initialized and proceeds along the NO branch of S106 to the process of S107. However, when the controller 61 has outputted an error, the controller 61 determines that the toner cartridge information 420 cannot be initialized and proceeds along the YES branch of S106 to the process of S109.

In step S107 the controller 61 executes an initialization process to initialize the toner cartridge information 420 stored in the toner memory 42. A detailed process flow for S107 will be described later with reference to FIG. 7.

In step S108 the controller 61 confirms whether or not an error has been outputted during the initialization process of S107. When the controller 61 has not outputted an error, the controller 61 determines that the toner cartridge information 420 has been successfully initialized, returns along the NO branch of S108 to S101, and causes the display 63 to display thereon the standby screen.

After successfully executing the initialization, the controller 61 may also cause the display 63 to display thereon an initialization successful screen for notifying the user that initialization was successful. However, when the controller 61 has outputted an error, the controller 61 determines that the initialization of the toner cartridge information 420 failed and proceeds along the YES branch of S108 to the process of S109.

In step S109 the controller 61 executes a display process to cause the display 63 to display thereon an error screen for notifying the user that the toner cartridge information 420 has not been initialized. In other words, when the controller 61 determines that the initialization conditions are not satisfied in S105, the controller 61 causes the display 63 to display thereon an error screen without executing the initialization process of S107.

(Process to Check Whether Initialization is Possible)

Figure 6:
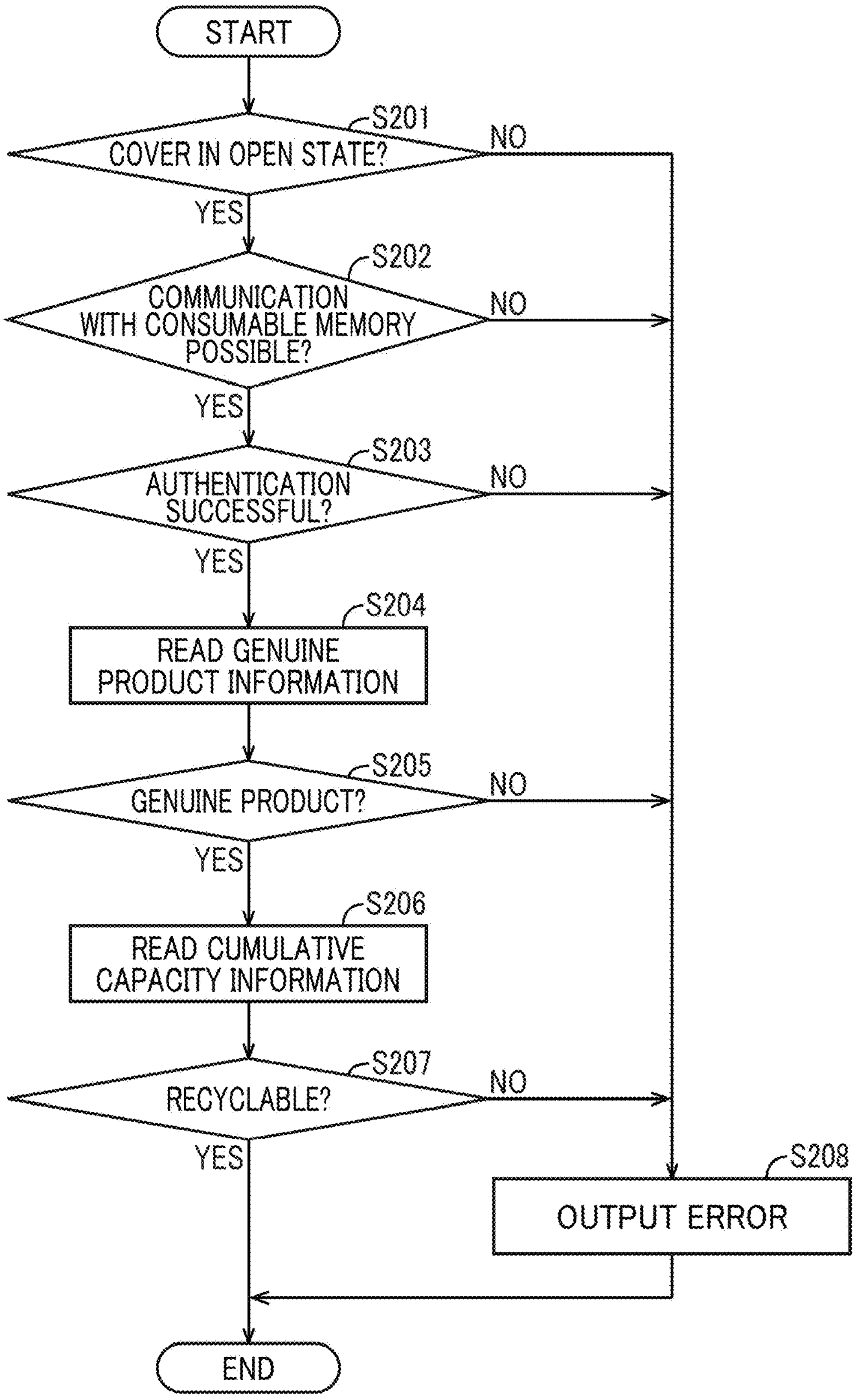
FIG. 6 is a flowchart illustrating the flow of steps in a detailed process for S105 of FIG. 5.

FIG. 6 is a flowchart illustrating the flow of steps in a detailed process for S105 of FIG. 5. In step S201 the controller 61 determines whether or not the cover 11 is in the open state. Specifically, the controller 61 determines the open or closed state of the cover 11 on the basis of detection results from the cover sensor 14.

In a case where the cover sensor 14 is configured to output a sensor signal to the controller 61 when the cover 11 is in the closed state, the controller 61 determines that the cover 11 is in the closed state upon receiving a sensor signal outputted by the cover sensor 14. However, in a case where the controller 61 does not receive a sensor signal from the cover sensor 14, the controller 61 determines that the cover 11 is in the open state.

Alternatively, in a case where the cover sensor 14 is configured to output a sensor signal to the controller 61 when the cover 11 is in the open state, the controller 61 determines that the cover 11 is in the closed state when the controller 61 does not receive a sensor signal from the cover sensor 14. However, the controller 61 determines that the cover 11 is in the open state upon receiving a sensor signal outputted by the cover sensor 14.

When determining that the cover 11 is in the open state, the controller 61 proceeds along the YES branch of S201 to the process in S202. However, when determining that the cover 11 is in the closed state, the controller 61 proceeds along the NO branch of S201 to the process in S208. Step S208 will be described later in detail.

In S202 the controller 61 determines whether or not communication is possible with the consumable memory, e.g., the toner memory 42. In a case where the controller 61 determines that the controller 61 cannot communicate with the toner memory 42, such as when the controller 61 cannot read information from the toner memory 42, the controller 61 proceeds along the NO branch of S202 to the process of S208. In a case where the controller 61 determines that communication with the toner memory 42 is possible, the controller 61 proceeds along the YES branch of S202 to the process of S203.

In step S203 the controller 61 performs the authentication of the toner cartridge 4. There is no particular restriction on the method of authenticating the toner cartridge 4. For example, the controller 61 may determine that the authentication of the toner cartridge 4 was successful when the model number of the toner cartridge 4 is compatible with the model number of the image forming apparatus 1. On the other hand, the controller 61 may determine that the authentication of the toner cartridge 4 failed when the model number of the toner cartridge 4 is not compatible with the model number of the image forming apparatus 1.

When the controller 61 can authenticate the toner cartridge 4, the controller 61 proceeds along the YES branch of S203 to the process of S204. However, when the controller 61 cannot authenticate the toner cartridge 4, the controller 61 proceeds along the NO branch of S203 to the process of S208.

In step S204 the controller 61 reads the genuine product information 430 from the toner memory 42. In step S205 the controller 61 determines whether or not the genuine product information 430 read in S204 is information indicating that the toner cartridge 4 is a genuine product.

When the controller 61 determines that the genuine product information 430 is information indicating that the toner cartridge 4 is a genuine product, the controller 61 proceeds along the YES branch of S205 to the process of S206. However, when the controller 61 determines that the genuine product information 430 is information indicating that the toner cartridge 4 is a non-genuine product, the controller 61 proceeds along the NO branch of S205 to the process of S208.

In step S206 the controller 61 reads the cumulative capacity information 423 from the toner memory 42. In step S207 the controller 61 determines whether or not the cumulative value of capacities indicated by the cumulative capacity information 423 read in S206 is less than a predetermined threshold value.

When the cumulative value of capacities indicated by the cumulative capacity information 423 is less than the predetermined threshold value, the controller 61 determines that the toner cartridge 4 is recyclable and proceeds along the YES branch of S207 to end the process of S105. However, when the cumulative value of capacities indicated by the cumulative capacity information 423 is greater than or equal to the predetermined threshold value, the controller 61 determines that the toner cartridge 4 is not recyclable and proceeds along the NO branch of S207 to the process of S208.

In step S208 the controller 61 outputs an error and determines that the initialization conditions are not satisfied. The controller 61 may causes the display 63 to display thereon an error screen in S109 of FIG. 5 indicating the cause of the error. When a NO determination is reached in S201, the error screen displayed in S109 includes a message indicating that the cover 11 is in the closed state.

When a NO determination is reached in S202, the error screen displayed in S109 includes a message indicating that a problem occurred in communicating with the toner memory 42. When a NO determination is reached in S203, the error screen displayed in S109 includes a message indicating that the toner cartridge 4 has not been authenticated. When a NO determination is reached in S205, the error screen displayed in S109 includes a message indicating that the toner cartridge 4 is a non-genuine product. When a NO determination is reached in S207, the error screen displayed in S109 includes a message indicating that the toner cartridge 4 is not recyclable.

As described above, the initialization conditions in S105 include that the cover 11 is in the open state, the controller 61 can communicate with the toner memory 42, and the controller 61 has authenticated the toner cartridge 4. The initialization conditions in S105 also include that the toner cartridge 4 is a genuine product and that the toner cartridge 4 is recyclable.

In S105 the controller 61 determines at least whether the cover 11 is in the open state. Further, the controller 61 determining that the initialization conditions are not satisfied in S105 is the same as the controller 61 determining in S105 at least that the cover 11 is in the closed state.

Further, the controller 61 may execute the initialization process in S107 when determining in S201 at least that the cover 11 is in the open state on the basis of the detection results from the cover sensor 14. Accordingly, the controller 61 can determine the open or closed state of the cover 11 on the basis of the detection results from the cover sensor 14 and can execute the initialization process when the cover 11 is in the open state.

Further, when the controller 61 does not receive a sensor signal from the cover sensor 14 in S201, the controller 61 may determine at least that the cover 11 is in the open state and may execute the initialization process. The controller 61 can determine that the cover 11 is in the open state when a sensor signal is not received from the cover sensor 14 and can execute the initialization process when the cover 11 is in the open state.

(Modifications of Steps S204 and S205)

In S204 the controller 61 may also read the supplier information 432 from the toner memory 42. After the controller 61 reads the supplier information 432, in S205 the controller 61 may determine whether or not the supplier information 432 read in S204 is information indicating the manufacturer of the image forming apparatus 1 or a preset third party.

When the controller 61 determines that the supplier information 432 is information indicating the manufacturer of the image forming apparatus 1 or the preset third party, the controller 61 proceeds along the YES branch of S205 to the process of S206. However, when the controller 61 determines that the supplier information 432 is not information indicating the manufacturer of the image forming apparatus 1 or the preset third party, the controller 61 proceeds along the NO branch of S205 to the process of S208.

Alternatively, in S204 the controller 61 may read the type information 425 from the toner memory 42. After the controller 61 reads the type information 425, in S205 the controller 61 may determine whether or not the type information 425 is information indicating the type "subscription consumable."

When the controller 61 determines that the type information 425 is information indicating the type "subscription consumable," the controller 61 proceeds along the YES branch of S205 to the process of S206. However, when the controller 61 determines that the type information 425 is not information indicating the type "subscription consumable," the controller 61 proceeds along the NO branch of S205 to the process of S208.

Further, in S204 the controller 61 may read the specification information 424 from the toner memory 42. After the controller 61 reads the specification information 424, in S205 the controller 61 may determine whether the specification information 424 is information indicating the specification for JP, for example.

When the controller 61 determines that the specification information 424 is information indicating the specification for JP, the controller 61 proceeds along the YES branch of S205 to the process of S206. However, when the controller 61 determines that the specification information 424 is not information indicating the specification for JP, the controller 61 proceeds along the NO branch of S205 to the process of S208.

As described above, the controller 61 may determine in S205 whether the toner memory 42 stores therein prescribed information indicating that the toner cartridge 4 is a target for the initialization process in S107.

Examples of the prescribed information are target genuine product information indicating that the toner cartridge 4 is a genuine product and target supplier information indicating the manufacturer of the image forming apparatus 1 or a preset third party as the prescribed supplier of the toner cartridges 4. Other examples of prescribed information are target consumable information indicating that the toner cartridge 4 is a subscription consumable and target specification information indicating the specification for JP as the prescribed specification of the toner cartridge 4. Note that the prescribed information may include at least one of the target genuine product information, the target supplier information, the target consumable information, and the target specification information.

Therefore, in S105 the controller 61 may determine whether the toner memory 42 stores therein prescribed information indicating that the toner cartridge 4 is a target for the initialization process in S107. Thus, the initialization of the toner cartridge information 420 in a toner memory 42 storing prescribed information indicating that the toner cartridge 4 is a target for the initialization process can be performed.

Further, when the toner memory 42 of a toner cartridge 4 stores the prescribed information, the controller 61 may advance along the YES branch of S205 to the process of S206 regardless of whether the toner cartridge 4 is a genuine product, a third party product, or a remanufactured product.

Alternatively, the controller 61 may determine in S105 whether the toner memory 42 stores at least one type of prescribed information from among the target genuine product information, target supplier information, target consumable information, and target specification information. Thus, the initialization of the toner cartridge information 420 in a toner memory 42 storing therein at least one of the target genuine product information, the target supplier information, the target consumable information, and the target specification information can be performed.

(Process to Initialize Cartridge Information)

Figure 7:
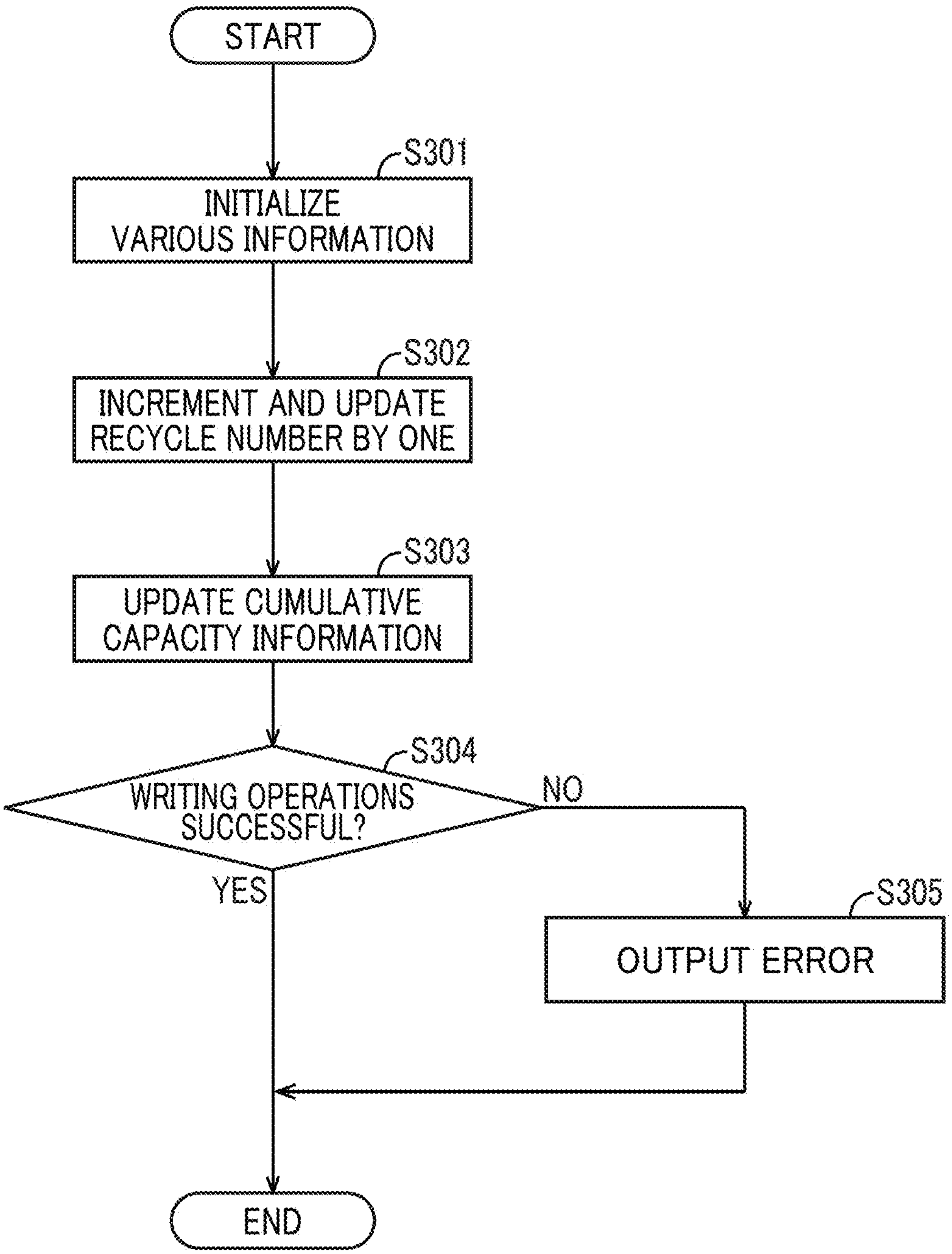
FIG. 7 is a flowchart illustrating the flow of steps in a detailed process for S107 of FIG. 5.

FIG. 7 is a flowchart illustrating the flow of steps in a detailed process for S107 of FIG. 5. In step S301 the controller 61 initializes various information among the toner cartridge information 420 stored in the toner memory 42. Specifically, the controller 61 resets the printed sheet number 426, which has been incremented up to a certain number of sheets, to zero and resets the developing roller rotation number 427, which has been incremented up to a certain number of rotations, to zero. The controller 61 also restores the remaining toner quantity 428, whose value has been reduced during the consumption of toner, to its initial value.

In step S302 the controller 61 increments the recycle number 429 stored in the toner memory 42 by one. In step S303 the controller 61 updates the cumulative capacity information 423 stored in the toner memory 42.

Specifically, the controller 61 rewrites the cumulative capacity information 423 with a capacity obtained by adding the current recycled capacity to the cumulative value of capacities indicated by the cumulative capacity information 423 read in S206. The current recycled capacity is the capacity indicated by the capacity information 422 stored in the toner memory 42 for which the controller 61 is executing the initialization process of S107.

In S304 the controller 61 determines whether or not the writing operations to the toner memory 42 were successful. When the controller 61 has successfully completed all writing operations in S301 to S303, the controller 61 proceeds along the YES branch of S304 to end the initialization process. However, when the controller 61 has failed to complete any of the writing operations in S301 to S303, the controller 61 proceeds along the NO branch of S304 to the process of S305.

In step S305 the controller 61 outputs an error since the controller 61 could not initialize the toner cartridge information 420. When reaching a NO determination in S304, the error screen displayed in S109 includes a message indicating that the toner cartridge information 420 could not be initialized.

<Process Flow in Recycled Product Usage Phase>

Figure 8:
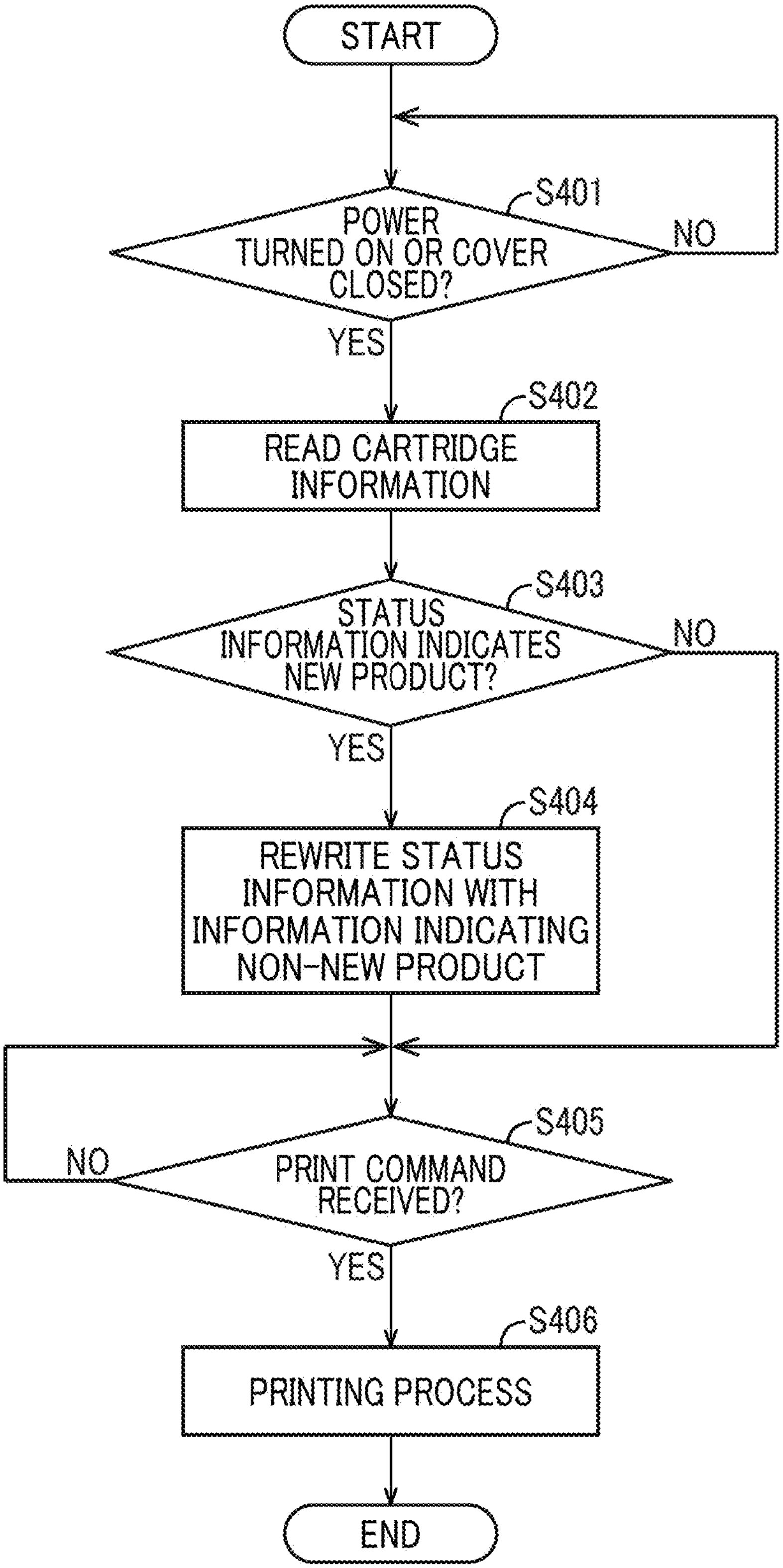
FIG. 8 is a flowchart illustrating the flow of steps in a process executed by the image forming apparatus in a recycled product usage phase.

FIG. 8 is a flowchart illustrating the flow of steps in a process executed by the image forming apparatus 1 in the recycled product usage phase. The series of steps illustrated in FIG. 8 are executed by the controller 61. The following describes a case in which the user uses a recycled toner cartridge 4 as one example.

In step S401 the controller 61 determines whether the power to the image forming apparatus 1 is turned on and whether the cover 11 is closed. When either the power to the image forming apparatus 1 is turned on or the cover 11 is closed, the controller 61 proceeds along the YES branch of S401 to the process of S402. When the cover 11 is open, on the other hand, the controller 61 continues to repeat the process of S401. Note that the controller 61 has already executed the process of S101 to S108 in FIG. 5 when determining that the cover 11 is closed.

In step S402 the controller 61 executes a reading process to read the toner cartridge information 420 from the toner memory 42 while the cover 11 is in the closed state. In particular, the controller 61 reads the status information 431 from the toner memory 42 in the reading process. Accordingly, while the cover 11 is in a closed state, the controller 61 can read the status information 431, which indicates whether the toner cartridge 4 is a new product or a non-new product, from the toner memory 42.

In step S403 the controller 61 determines whether or not the status information 431 of the toner cartridge information 420 read in S402 is information indicating that the toner cartridge 4 is a new product. When the status information 431 is information indicating that the toner cartridge 4 is a new product, the controller 61 proceeds along the YES branch of S403 to the process of S404. When the status information 431 is information indicating that the toner cartridge 4 is a non-new product, the controller 61 proceeds along the NO branch of S403 to the process of S405.

When the cover 11 is in the closed state and the status information 431 is information indicating a new product, in step S404 the controller 61 executes a rewriting process to rewrite the status information 431 indicating a new product with information indicating a non-new product. Accordingly, while the cover 11 is in the closed state, the controller 61 can execute a process to rewrite the status information 431 from information indicating a new product to information indicating a non-new product.

In step S405 the controller 61 waits until a print command is received. When the user instructs printing via the operation unit 64, the controller 61 receives a print command. Upon receiving a print command, in step S406 the controller 61 executes a printing process.

Consider a case in which the image forming apparatus 1 begins using the toner cartridge 4 in the above description after the controller 61 has initialized the toner cartridge information 420 in S107 of FIG. 5. When the image forming apparatus 1 begins using the toner cartridge 4, the controller 61 needs to execute a reading process in S402 of FIG. 8 to read the toner cartridge information 420 from the toner memory 42. In order to reduce the user's operation load, the controller 61 preferably executes the reading process when the power to the image forming apparatus 1 is turned on or when the cover 11 is closed.

The controller 61 initializes the toner cartridge information 420 in S107 of FIG. 5 when the cover 11 is in the open state in S201 of FIG. 6. Consequently, the cover 11 is in the open state after the controller 61 initializes the toner cartridge information 420.

Therefore, the controller 61 can execute the reading process in S402 to read the toner cartridge information 420 from the toner memory 42 when the cover 11 is in the closed state in S401 of FIG. 8. Hence, the user can begin to use the toner cartridge 4 immediately after the controller 61 has initialized the toner cartridge information 420, without having to turn the power to the image forming apparatus 1 off and back on.

Furthermore, the controller 61 does not execute the initialization process in S107 of FIG. 5 to initialize the toner cartridge information 420 while the cover 11 is in the closed state but causes the display 63 to display thereon an error message in S109. Thus, the user can recognize that an error has occurred. Moreover, the closed state of the cover 11 can prevent the controller 61 from being unable to execute the reading process in S202 of FIG. 6 to read the toner cartridge information 420 from the toner memory 42.

(First Modification)

The developing roller 41 of the present embodiment may be provided in the toner cartridge 4 or in the drum cartridge 20, provided that the functions described in the above embodiment can be implemented.

(Second Modification)

In the present embodiment, the toner cartridge 4 is inserted into the opening part formed in the corresponding cartridge holding unit 13 together with the drum cartridge 20 while attached to the drum cartridge 20. In other words, the toner cartridge 4 and the drum cartridge 20 are separate cartridges in the present embodiment. However, the toner cartridge 4 and drum cartridge 20 may be integrally configured as a single cartridge.

(Third Modification)

The printing medium of the image forming apparatus 1 is not limited to paper. For example, the printing medium may be tape. When the printing medium is tape, a tape cassette that supplies tape is attached to the image forming apparatus 1. The image forming apparatus 1 prints on tape conveyed out of the tape cassette.

(Fourth Modification)

The image forming apparatus 1 may also be a multifunction peripheral (MFP) having other functions, such as a scanning or a facsimile function. Even when an image forming apparatus 1 is configured as an MFP, the image forming apparatus 1 can execute the same various processes described for the image forming apparatus 1 of the present embodiment. The image forming apparatus 1 according to the present modification exhibits effects the same as the image forming apparatus 1 in the present embodiment.

[Implementation Through Software]

The functions of the image forming apparatus 1 can be implemented by a program for causing a computer to function as the image forming apparatus 1 and for causing the computer to function as each control block of the image forming apparatus 1, and as the controller 61 in particular.

In this case, the image forming apparatus 1 includes a computer possessing at least one control device (for example, a processor) and at least one storage device (for example, a memory) as the hardware required for executing the program described above. Each function described in the above embodiment is implemented by executing the program described above using the control device and storage device described above.

The program may be stored in one or more non-transitory computer-readable storage media. These storage media may be provided in the image forming apparatus 1 but need not be. In the latter case, the program may be supplied to the image forming apparatus 1 through any wired or wireless transmission medium.

All or a part of the functions of the control blocks described above can also be implemented by logic circuits. For example, an integrated circuit in which logic circuits that function as the control blocks described above are formed falls within the scope of the present disclosure. Additionally, the functions of the control blocks described above can be implemented with a quantum computer, for example.

The present disclosure is not limited to the embodiment described above, and various modifications may be made thereto within the scope indicated in the claims. A configuration obtained by suitably combining different technical means disclosed in the embodiment also falls within the technical scope of the present disclosure.

What is claimed is:

1. An image forming apparatus comprising:

a consumable including a consumable memory;

a main casing to which the consumable is attached, the main casing having an opening through which the consumable is attachable;

a cover configured to open and close the opening; and a controller, wherein the controller is configured to perform:

a reception process receiving an instruction to initialize consumable memory information stored in the consumable memory;

a determination process determining at least whether the cover is in an open state in accordance with the received instruction;

when determining at least that the cover is in the open state, an initialization process initializing the consumable memory information; and a reading process reading the consumable memory information from the consumable memory while the cover is in a closed state.

2. The image forming apparatus according to claim 1, wherein, in the determination process, the controller determines whether the consumable memory stores prescribed information indicating that the consumable is a target for the initialization process.

3. The image forming apparatus according to claim 2, wherein, in the determination process, the controller determines whether the consumable memory stores at least one type of the prescribed information from among:

target genuine product information indicating that the consumable is a genuine product;

target supplier information indicating a prescribed supplier of the consumable;

target consumable information indicating that the consumable is a subscription consumable that can be used in the image forming apparatus for which an agreement is concluded; and target specification information indicating a prescribed specification of the consumable.

4. The image forming apparatus according to claim 1, further comprising:

a display, wherein the controller is configured to perform:

when determining at least that the cover is in the closed state, a display process causing the display to display an error screen, without performing the initialization process.

5. The image forming apparatus according to claim 1, further comprising:

a cover sensor provided at the opening, the cover sensor being configured to detect opening and closing of the cover, wherein, when determining at least that the cover is in the open state, the controller performs the initialization process.

6. The image forming apparatus according to claim 1, further comprising:

a cover sensor provided at the opening, the cover sensor being configured to output a sensor signal to the controller when the cover is in the closed state, wherein, when the controller does not receive the sensor signal from the cover sensor, the controller determines at least that the cover is in the open state and performs the initialization process.

7. The image forming apparatus according to claim 1, wherein the consumable memory is configured to store status information indicating whether the consumable is a new product or a non-new product, and wherein after performing the initialization process, the controller reads the status information from the consumable memory in the reading process.

8. The image forming apparatus according to claim 1, wherein the consumable memory is configured to store status information indicating whether the consumable is a new product or a non-new product, and wherein the controller is configured to perform:

after performing the initialization process, when the status information is information indicating that the consumable is the new product, a rewriting process rewriting the status information from the information indicating that the consumable is the new product to information indicating that the consumable is the non-new product while the cover is in the closed state.

9. An initialization method of initializing a consumable memory included in a consumable attached to a main casing of an image forming apparatus, the initialization method comprising:

a reception step in which the image forming apparatus receives an instruction to initialize consumable memory information stored in the consumable memory;

a determination step in which the image forming apparatus determines at least whether a cover is in an open state in accordance with the received instruction, the main casing having an opening through which the consumable is attachable, the cover being configured to open and close the opening;

when the image forming apparatus determines at least that the cover is in the open state, an initialization step in which the image forming apparatus initializes the consumable memory information; and a reading step in which the image forming apparatus reads the consumable memory information from the consumable memory while the cover is in a closed state.

10. The initialization method according to claim 9, wherein, in the determination step, the image forming apparatus determines whether the consumable memory stores prescribed information indicating that the consumable is a target for the initialization step.

11. The initialization method according to claim 10, wherein, in the determination step, the image forming apparatus determines whether the consumable memory stores at least one type of the prescribed information from among:

target genuine product information indicating that the consumable is a genuine product;

target supplier information indicating a prescribed supplier of the consumable;

target consumable information indicating that the consumable is a subscription consumable that can be used in the image forming apparatus for which an agreement is concluded; and target specification information indicating a prescribed specification of the consumable.

12. The initialization method according to claim 9, further comprising:

when the image forming apparatus determines in the determination step at least that the cover is in the closed state, a display step in which the image forming apparatus causes a display of the image forming apparatus to display an error screen, without performing the initialization step.

13. The initialization method according to claim 9, wherein, when the image forming apparatus determines in the determination step at least that the cover is in the open state on the basis of a determination result of a cover sensor of the image forming apparatus provided at the opening and configured to detect opening and closing of the cover, the image forming apparatus performs the initialization step.

14. The initialization method according to claim 9, wherein, when the image forming apparatus does not receive a sensor signal from a cover sensor provided at the opening, the image forming apparatus determines in the determination step at least that the cover is in the open state, and performs the initialization step.

15. The initialization method according to claim 9, wherein the consumable memory is configured to store status information indicating whether the consumable is a new product or a non-new product, and wherein after performing the initialization step, the image forming apparatus reads the status information from the consumable memory in the reading step.

16. The initialization method according to claim 9, wherein the consumable memory is configured to store status information indicating whether the consumable is a new product or a non-new product, and wherein the initialization method further comprises:

after the initialization step is performed, when the status information is information indicating that the consumable is the new product, a rewriting step in which the image forming apparatus rewrites the status information from the information indicating that the consumable is the new product to information indicating that the consumable is the non-new product while the cover is in the closed state.

* * * * *